(12) United States Patent
Hayden et al.

(10) Patent No.: US 9,033,664 B2
(45) Date of Patent: May 19, 2015

(54) BLADE FOR A TURBINE OPERATING IN WATER

(75) Inventors: Paul Trevor Hayden, Cowes (GB); David Anthony Whiley, Shrewsbury (GB); Derek Ness, Ventnor (GB)

(73) Assignee: Blade Dynamics, Ltd., Cowes, Isle of Wight (GB)

( * ) Notice: Subject to any disclaimer, the term of this patent is extended or adjusted under 35 U.S.C. 154(b) by 0 days.

(21) Appl. No.: 13/560,806

(22) Filed: Jul. 27, 2012

(65) Prior Publication Data

US 2013/0022472 A1 Jan. 24, 2013

Related U.S. Application Data

(63) Continuation of application No. PCT/GB2011/000112, filed on Jan. 28, 2011.

(30) Foreign Application Priority Data

Jan. 29, 2010 (GB) .................................. 1001527.9

(51) Int. Cl.
- *F03B 3/12* (2006.01)
- *B29C 70/74* (2006.01)
- *B29K 105/16* (2006.01)

(52) U.S. Cl.
CPC ............ *F03B 3/121* (2013.01); *B29C 70/745* (2013.01); *B29K 2105/16* (2013.01); *F05B 2220/32* (2013.01); *F05B 2280/6003* (2013.01); *F05B 2280/6015* (2013.01); *F05C 2253/04* (2013.01); *F05C 2253/20* (2013.01); *Y02E 10/223* (2013.01); *Y02E 10/28* (2013.01)

(58) Field of Classification Search
CPC .............. F01D 5/282; F03B 3/00; F03B 3/12; F03B 3/121; F03B 3/126
USPC ........................ 416/223 R, 230, 232, 233, 84
See application file for complete search history.

(56) References Cited

U.S. PATENT DOCUMENTS

| | | | | |
|---|---|---|---|---|
| 2,767,461 A | * | 10/1956 | Lebold et al. | 29/889.6 |
| 3,980,894 A | * | 9/1976 | Vary et al. | 290/54 |
| 5,096,384 A | * | 3/1992 | Immell et al. | 416/229 R |
| 5,145,320 A | * | 9/1992 | Blake et al. | 416/230 |
| 5,273,819 A | | 12/1993 | Jex | |
| 6,139,278 A | * | 10/2000 | Mowbray et al. | 416/229 A |

(Continued)

FOREIGN PATENT DOCUMENTS

| | | |
|---|---|---|
| EP | 1 880 833 | 1/2008 |
| GB | 1229595 | 4/1971 |
| GB | 2041829 | 9/1980 |
| WO | WO 03/035380 | 5/2003 |

(Continued)

OTHER PUBLICATIONS

International Search report issued on Nov. 15, 2011 in connection with International Application No. PCT/GB2011/000112, filed on Jan. 28, 2011.

(Continued)

*Primary Examiner* — Dwayne J White
*Assistant Examiner* — Su Htay
(74) *Attorney, Agent, or Firm* — Knobbe, Martens, Olson & Bear, LLP

(57) ABSTRACT

A blade for use in water, the blade comprising an outer shell of fiber reinforced plastic defining a cavity. A substantial portion of the cavity is filled with a resin which adheres to the inner wall of the shell.

14 Claims, 1 Drawing Sheet

(56) References Cited

U.S. PATENT DOCUMENTS

| | | | |
|---|---|---|---|
| 2004/0018091 A1* | 1/2004 | Rongong et al. | 416/229 A |
| 2006/0152011 A1* | 7/2006 | Fraenkel | 290/54 |
| 2009/0075084 A1* | 3/2009 | Kochi et al. | 428/409 |
| 2009/0246446 A1* | 10/2009 | Backhouse | 428/76 |
| 2010/0062238 A1 | 3/2010 | Doyle et al. | |
| 2010/0140947 A1 | 6/2010 | McEntee et al. | |
| 2011/0176915 A1 | 7/2011 | Keir et al. | |

FOREIGN PATENT DOCUMENTS

| | | |
|---|---|---|
| WO | WO 2004/029448 | 4/2004 |
| WO | WO 2009/126996 | 10/2009 |
| WO | WO 2010/114794 | 10/2010 |

OTHER PUBLICATIONS

Written Opinion issued in connection with International Application No. PCT/GB2011/000112, filed on Jan. 28, 2011.

* cited by examiner

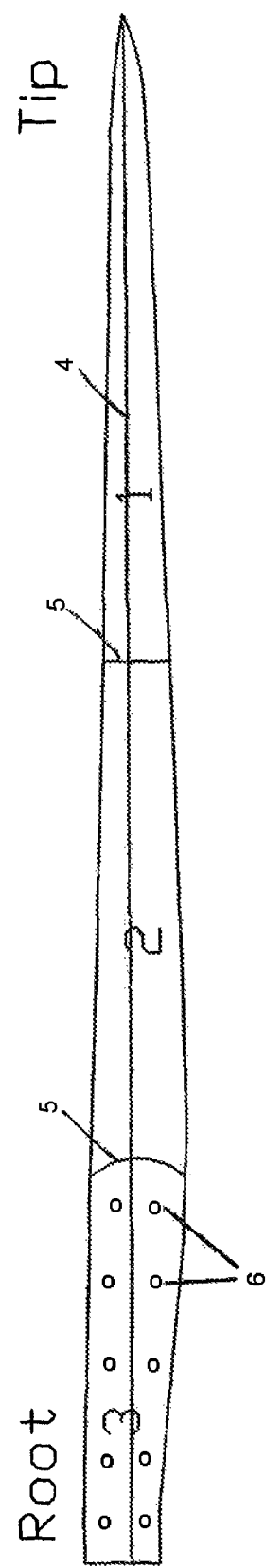

BLADE FOR A TURBINE OPERATING IN WATER

CROSS-REFERENCE TO RELATED APPLICATIONS

This application is a continuation of Patent Cooperation Treaty International Patent Application PCT/GB2011/000112, filed Jan. 28, 2011, and entitled "A BLADE FOR A TURBINE OPERATING IN WATER," which is incorporated by reference herein in its entirety, and which claims priority to Great Britain Patent Application 1001527.9, filed on Jan. 29, 2010.

BACKGROUND

1. Field

The present invention relates to a blade with a turbine operating in water, such as a device driven by tidal or river flow. It is particularly designed for a turbine arranged to rotate about a horizontal axis. However, the blade is suitable for use in any orientation.

2. Description of the Related Art

For a turbine arranged to rotate about a horizontal axis in water, the blades are conventionally hollow. However, this leads to a problem in that as the blade rotates about the horizontal axis, its depth changes. At the tip of the blade, there is a variation in depth in a single rotation equal to the diameter of the blade. This subjects the blade to significant variations in static pressure, which, on a hollow blade translates to repeat expansive and compressive forces giving rise to potentially severe cyclical stress problems.

One attempt to solve this problem is disclosed in WO 2004/029448.

This raises the possibility of filling the void with a lightweight material such as foamed plastic, but observes that the cyclic loading will cause the filler material to become detached from the outer shell thereby creating a void. WO 2004/029448 rejects this approach in favour of filling the blade with liquid. The pressure of this liquid is then allowed to fluctuate either by allowing liquid into and out of the blade, or by providing a pressure compensating device such as a diaphragm or piston to equalise the internal and external pressures.

With a liquid filled device, the centrifugal forces which are experienced in use will cause an increase in pressure at the tip of the blade. If this is vented, the internal space of the blade is not sealed and can be subject to fouling. On the other hand, if the space is sealed then stress at the tip can cause damage. Also, the variations in internal pressure caused by the centrifugal forces are unpredictable and can damage the internal structure.

SUMMARY

According to the present invention, there is provided a blade for use in water, the blade comprising an outer shell of fibre reinforced plastic defining a cavity, a substantial portion of the cavity being filled with a resin which adheres to the inner wall of the shell.

The use of a resin results in a blade which is simple to manufacture, can readily deal with the cyclic pressure loading and has excellent adhesion with the outer shell of the blade. The resin can also be designed to have neutral buoyancy and not to be too heavy. It is therefore easy to install and maintain. As the filling is solid, there are no internal pressure variations caused by centrifugal forces and the blade can be sealed. Also, a solid filled blade is more robust and hence more impact resistant in the event of being struck by marine life.

The resin may be an unfilled resin. However, preferably, the resin is a filled resin. The use of a filler has two potential benefits. Firstly, it reduces the amount of resin and hence the cost of the blade. Secondly, if the filler is low density or hollow, it can improve the buoyancy of the blade.

The cavity may be divided into a number of sections with the density in one section being different from the density in an adjacent section. There may also be sections which are open to the flow of water.

The filled resin preferably has a density of between 500 kg/m$^3$ to 2000 kg/m$^3$ is preferably in a range of 600-1200 kg/m$^3$.

The resin used for the filled resin is selected from a range of resins such as polyester, vinylester, epoxy, phenolic, polyurethane and polypropylene. The preferred resin is epoxy.

The resin can be cured with a suitable curing agent such as aliphatic amine, cycloaliphatic amine, aromatic amine, anhydride, dicyandiamide, imidazole, or boron trifluoride complex. The preferred curing agent is an aromatic amine. The aromatic amines can be formulated to give a filled resin that will have a favourable reaction rate. That is one that will both cure sufficiently at ambient temperature, whilst not developing an excessive amount of heat during the curing process, and thus eliminating the possibility of a thermal runaway, commonly known as an uncontrolled exotherm that could damage the shell.

The filler could be a mineral such as Calcium Carbonate, Talc, Barium Sulphate, silica or solid glass spheres. It could be a fibrous filler such as chopped or milled glass, chopped thermoplastic fibres or carbon fibre. It could be a hollow filler such as hollow glass microspheres, hollow alumino-silicate microspheres, hollow phenolic microspheres, macrospheres made from glass epoxy, carbon epoxy or thermoplastic resin. It could be any combination of the above.

The filler is typically present with a range of 0-60% by volume of the filled resin.

The resin may contain 0-10% (typically 1%) by weight of thixotrope to aid flow and to ensure that the fillers do not settle out or float up to the surface prior to cure. The preferred thixotrope is colloidal silica (trade name Cabosil M5).

The resin may also contain additives to aid the wetting, flow or air release properties of the material.

The fibre reinforced plastic of the shell preferably has fibres of glass or carbon. The plastic may be a thermoset material such as epoxy, polyester or vinylester, or may be a thermoplastic such as polypropylene. The current preference is for the shell to be epoxy as this has a good affinity for epoxy used for the cast resin and also excellent resistance for long term immersion in water.

The centre region of the rotor blade will experience a number of forces applied to it. When the blade is loaded due to the action of the flow of water, the blade will deflect. One face of the blade will experience a tensile load and the other will experience a compressive load. The shell is designed to withstand these major loads. There will also be associated with these major loads a smaller though significant loading on the centre of the blade where it is loaded in shear. The blade may be designed so that the resin takes this load and, as the resin has good load carrying capability, it is possible to design such a blade. Conversely it may be decided that the shear loads are in excess of the shear carrying capability of the cast resin and a structural shear web member may be placed within the cast resin.

The other loads on the cast resin are compressive due to the pressure of water. This load is dependant on the depth of the turbine and will vary dependant on the radius of rotation and the length of the blades. The resin has a high compressive strength and compressive modulus and thus will accommodate this loading well giving very low deflection under the cyclical compressive loads induced by the rotation and thus subjecting the main load carrying shell to very low loadings.

The present invention also extends to a method of forming a blade for use in water, the method comprising: forming two shell halves of fibre reinforced plastic, each half defining a cavity; filling a substantial portion of each cavity with a resin which adheres to the wall of the shell half; and applying adhesive to the exposed surfaces of the resin; and adhering the two parts together.

Preferably, the method further comprises providing the resin in the cavity to a level below the edge of the shell to define a gap for adhesive.

Preferably, the method further comprises inserting bulkheads into the two halves of the shell to create a number of different sections and filling the sections with resins of different density.

Preferably, the method further comprises the step of inserting a shear web along the length of one shell half before it is filled with resin; inserting a dummy shear web coated with a release coating in the opposite shell half; and removing the dummy shear web after the resin is cured.

BRIEF DESCRIPTION OF THE DRAWINGS

An example of a blade in accordance with the present invention will now be described with reference to the accompanying drawing which is a plan view of the blade.

DETAILED DESCRIPTION

The preferred resin mix is a low viscosity, reactive diluent modified, epoxy resin, cured with a low exotherm ambient curing aromatic amine curing agent. This would have an amount of glass microspheres added to give a mix density of 700 kg/m$^3$.

The glass microspheres which can be used for the filled resin are normally 15-20 microns in diameter with a density of 0.125 to 0.6 g/cc. These are normally used at a loading of 0-60% depending on the density required from the final cured resin mix.

Typically, such a glass microsphere filled epoxy resin has a shear strength of 2 MPa-60 MPa depending on filler type and loading, but a typical glass microsphere loaded filled resin with a density of 600 kg/m$^3$ would have a shear strength of 3-8 MPa.

The compressive properties of such a glass microsphere filled epoxy resin are 12 MPa-120 MPa depending on filler type and loading, but a typical glass microsphere loaded filled resin with a density of 600 kg/m$^3$ would have a compressive strength of 20 MPa.

The tensile properties of such a glass microsphere filled epoxy resin are 13 MPa-70 MPa depending on filler type and loading, but a typical glass microspheres loaded filled resin with a density of 500 kg/m$^3$ would have a tensile strength of 28 MPa.

The FIGURE shows a blade for an underwater power generator. It is composed of a number of sections denoted by 1, 2 and 3. The total length of the blade is of the order of 8 m. The cast resin could be used to fill the entire blade however it is sometimes desirable to use differing materials different areas of the blade. For example at the root of the blade (area 3) where the cyclical pressure loadings are low this area could be free flooding (i.e. hollow with orifices 6 for the entry and exit of water). Area 2 towards the centre section of the blade could be filled with a cast resin with a relatively high density eg. 600 kg/m$^3$. Area 1 where the cyclic loads are highest could be filled with a cast resin mix with a density of 1000 kg/m$^3$.

The manner in which the blade is manufactured will now be described.

One possible manufacturing method would be to join two shell parts together and then fill the void with the filled resin. This would be suitable for smaller blades but is more difficult for larger blades.

However, preferably, the following technique is used.

Two moulds are prepared each of which have the configuration of one of the two halves of the blade shell. A gel coat is then applied to the surface of each of these moulds and structural fibres are then placed into the tool cavities. The vacuum bag is then applied and the mould fibrous material is infused with a thermoset resin which is cured in order to form the two shells. If it is being used, a shear web 4 running along the length of the blade is fitted and bonded into one of the halves and a dummy shear web is fitted into the upper half. The dummy shear web has the same shape and size as a portion of the actual shear web which will ultimately be inserted into the second part of the blade, but is coated with a release coating to allow it to be removed.

If bulkheads 5 are being used, these are then fitted into the two parts. The appropriate filled resin is then applied to the appropriate partitioned section as set out above and the resin is cured. As it cures, the resin shrinks. However, as the cavity is a wide shallow space, it does not tend to pull away from the shell wall. Ideally, the resin will shrink back to a position just beneath the top edge of the shell half. If this does not happen, the resin may be removed by a mechanical process.

The dummy shear web (if present) is then removed from one of the mouldings. Adhesive is applied over both halves of the rotor and the sections are closed together. The adhesive is applied over the entire surface of the resin providing a large bonding surface and hence a very strong joint. Also, the adhesive readily fills the gap created by the fact that the resin level is slightly below the edge of the shell half. Thus, this process is able to provide a strong joint and the adhesive, by filling the gap, is able to compensate for any manufacturing tolerances in the resin.

The adhesive is then cured and the finished blade removed from the moulds. A leading edge strip may be added to the blade if necessary.

What is claimed is:

1. A blade for use in water, the blade comprising an outer shell of fibre reinforced plastic defining a cavity, a substantial portion of the cavity being filled with a resin which adheres to the inner wall of the shell, wherein the cavity is divided into a number of sections, each section occupying less than the whole length of the span of the blade, arranged one next to the other in a direction of arrangement, the direction of arrangement being along the length of the span from the blade root toward the blade tip, with the density in one section being different from the density in an adjacent section such that the density of the blade varies along the span of the blade,
   wherein a section of the cavity comprising the blade root comprises one or more orifices for the entry and exit of water.

2. A blade according to claim 1, wherein the resin has a density of between 500 kg/m$^3$ to 2000 kg/m$^3$.

3. A blade according to claim 2, wherein the resin has a density of 600-1200 kg/m$^3$.

4. A blade according to claim 1, wherein the resin is selected from a range of thermoset resins such as polyester, vinylester, epoxy, phenolic, polyurethane and polypropylene.

5. A blade according to claim 1, wherein the resin is a filled resin.

6. A blade according to claim 5, wherein a filler of the filled resin is selected from a mineral such as Calcium Carbonate, Talc, Barium Sulphate, silica or solid glass spheres; a fibrous filler such as chopped or milled glass, chopped thermoplastic fibres or carbon fibre; or a hollow filler such as hollow glass microspheres, hollow alumino-silicate microspheres, hollow phenolic microspheres, macrospheres made from glass epoxy, carbon epoxy or thermoplastic resin.

7. A blade according to claim 5, wherein a filler of the filled resin is present with a range of 0-60% by volume of the filled resin.

8. A blade according to claim 1, wherein the resin contains 0-10% by weight of thixotrope.

9. A blade according to claim 1, wherein a shear web running along the length of the blade is embedded in the resin.

10. A method of forming a blade for use in water, the method comprising:
- forming two shell halves of fibre reinforced plastic, each half defining a cavity;
- inserting bulkheads into the two halves of the shell to create a number of different sections, each section occupying less than the whole length of the span of the blade, arranged one next to the other in a direction of arrangement, the direction of arrangement being along the length of the span from the blade root toward the blade tip such that the density of the blade varies along the span of the blade, wherein a section of the cavity comprising the blade root comprises one or more orifices for the entry and exit of water;
- filling a substantial portion of each cavity with a resin which adheres to a wall of the respective shell such that the sections have resins of different density;
- applying adhesive to exposed surfaces of the resin of each cavity; and
- adhering the two shell halves together.

11. A method according to claim 10, wherein the resin of each cavity is provided in the respective cavity to a level below an edge of the respective shell to define a gap for the adhesive.

12. A method according to claim 10, further comprising a step of inserting a shear web along the length of the span of one shell half before it is filled with resin;
- inserting a dummy shear web coated with a release coating in the opposite shell half; and
- removing the dummy shear web after the resin is cured.

13. A method for using the blade of claim 1, the method comprising:
- providing the blade according to claim 1 as a component of an underwater turbine; and
- using the blade in water.

14. An apparatus comprising:
- an underwater blade having an outer shell of fibre reinforced plastic defining a cavity, a substantial portion of the cavity being filled with a resin which adheres to the inner wall of the shell, wherein the cavity is divided into a number of sections, each section occupying less than the whole length of the span of the blade, arranged one next to the other in a direction of arrangement, the direction of arrangement being along the length of the span from the blade root toward the blade tip, with the density in one section being different from the density in an adjacent section such that the density of the blade varies along the span of the blade,
- wherein a section of the underwater blade comprising the blade root comprises at least one orifice for the entry and exit of water.

* * * * *